No. 875,424. PATENTED DEC. 31, 1907.
J. H. GILLIES.
PROCESS FOR THE TREATMENT OF ZINCIFEROUS ORES AND METALLURGICAL PRODUCTS.
APPLICATION FILED AUG. 20, 1906.
3 SHEETS—SHEET 1.
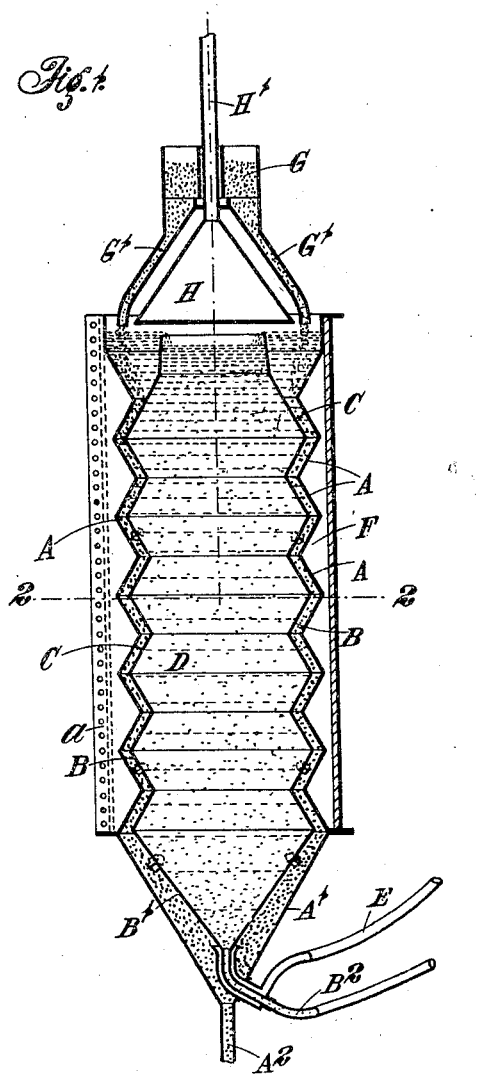
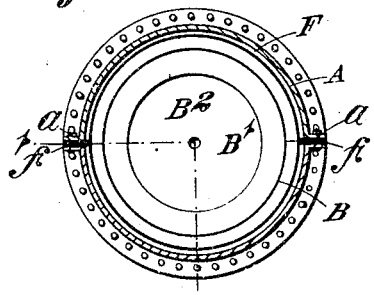
Witnesses.
Inventor.
James Hyndes Gillies
By James L. Norris
Atty.

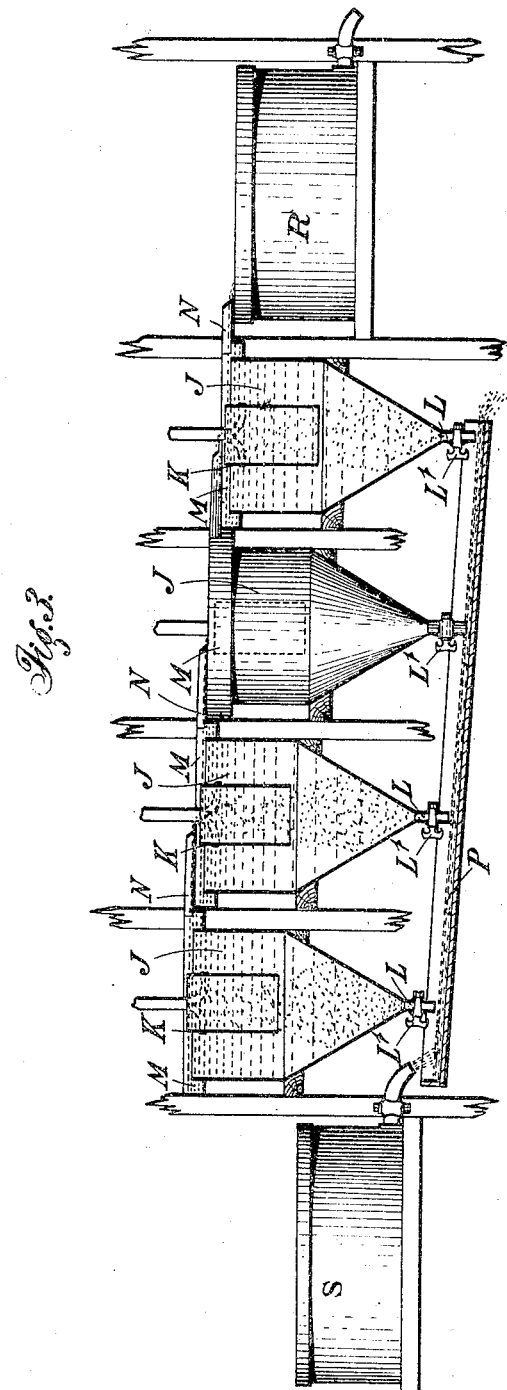

No. 875,424. PATENTED DEC. 31, 1907.
J. H. GILLIES.
PROCESS FOR THE TREATMENT OF ZINCIFEROUS ORES AND METALLURGICAL PRODUCTS.
APPLICATION FILED AUG. 20, 1906.
3 SHEETS—SHEET 3.
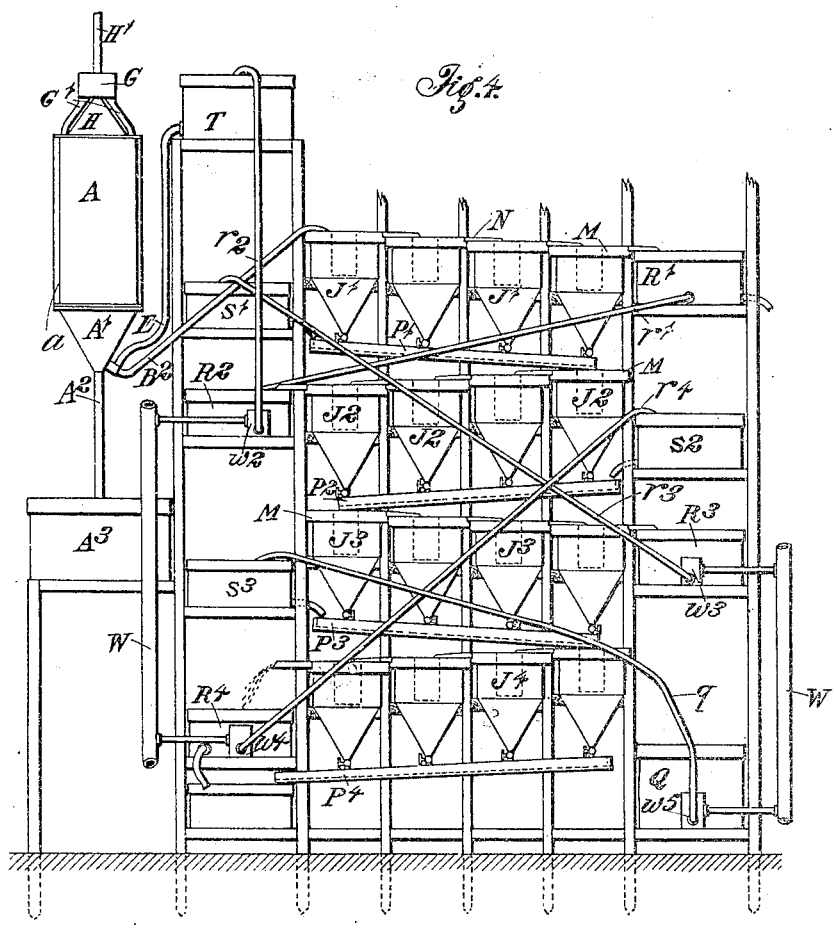

UNITED STATES PATENT OFFICE.

JAMES HYNDES GILLIES, OF AUBURN, VICTORIA, AUSTRALIA.

PROCESS FOR THE TREATMENT OF ZINCIFEROUS ORES AND METALLURGICAL PRODUCTS.

No. 875,424.

Specification of Letters Patent.

Patented Dec. 31, 1907.

Application filed August 20, 1906. Serial No. 331,375.

*To all whom it may concern:*

Be it known that JAMES HYNDES GILLIES, citizen of the Commonwealth of Australia, residing at "Mia Mia," Riversdale Road, Auburn, in the State of Victoria, Commonwealth of Australia, mining engineer, have invented certain new and useful Improvements in an Improved Process for the Treatment of Zinciferous Ores and Metallurgical Products, of which the following is a specification.

My invention relates to an improved process for the treatment of zinciferous ores and metallurgical products, and refers more particularly to the treatment of zinc sulfid ores generally know as "refractory" in which the zinc is associated with such metals as iron lead and copper, and have hitherto been very difficult of treatment.

Though my invention is herein described as applied to the treatment of zinc sulfid ores, it will be well understood that the term "ores" includes "concentrates" or other metallurgical products to which the process is applicable.

Hitherto many attempts and suggestions have been made for the treatment of these ores by what is known as the "wet" method by leaching after roasting for the removal of the zinc as sulfate. In some cases the ores have been roasted for the formation of zinc sulfate which is then removed by leaching with water, while in others after being roasted to sulfate and oxid the leaching has been effected with dilute sulfuric acid or again sulfurous acid gas with air and steam has been introduced while the ores are suspended in water in vats. These attempts have, however, been more or less unsuccessful when applied on a commercially metallurgical scale owing to the formation of gelatinous silica and the rehydration of the sulfates formed in the washing and the tendency of the ore to agglomerate and cake when treated in the way mentioned.

The object of this present invention is to provide a process by which the zinc may be removed continuously and expeditiously by leaching with sulfuric acid, while the other metals are left in the residues and tailings in a suitable condition for subsequent treatment, preferably by smelting. The zinc sulfate is then afterwards preferably converted into oxid for use as a pigment. I accomplish this object by providing a process consisting of a series of steps or operations as hereinafter described in which the crushed ore is first roasted to form a maximum amount of zinc sulfate and a minimum amount of sulfates of other metals then feeding such roasted ore continuously into an upwardly moving current of dilute sulfuric acid, and finally continuously separating the solution of zinc sulfate in a more or less concentrated form from the gangue and mineral particles. The ore particles being thus brought into contact with a moving leaching liquor and the solution formed being continuously separated from the gelatinous silica and other solids, the leaching is effected continuously and expeditiously, while the possibility of agglomerating or caking is reduced to a minimum.

In order that my invention may be the better understood I will now proceed to describe the same by reference to the accompanying drawings in which is shown a plant for carrying out the same, though it will be well understood that my improved process is not confined to this apparatus.

Figure 1 is a vertical sectional elevation (line 1—1, Fig. 2) showing the leaching vessel. Fig. 2 is a plan of the same in section (on the line 2—2, Fig. 1). Fig. 3 is an elevation partly in section of one series or group of separator vessels. Fig. 4 is an elevation of the complete plant.

In carrying out the process, the ore is first subjected to a sulfating roast in a reverberatory or muffle surface to form a maximum amount of sulfate of zinc consistent with obtaining at the same time a maximum amount of oxids of copper and iron. For this purpose the temperature, particularly at the finish, must be carefully controlled so as to be sufficiently high to decompose any sulfates of iron and copper formed, but not high enough to decompose an undue proportion of the sulfate of zinc to oxid. The roasting is preferably carried out in a furnace with superimposed hearths and mechanical rabbles so that the feed and delivery of the ore is continuous and automatic. The sulfurous acid gases from this roasting furnace are preferably conducted to chambers for the formation of sulfuric acid for subsequent use in the process.

The roasted ore while still hot is delivered into a vessel in which there is an upward current of dilute sulfuric acid. A suitable vessel for this purpose is shown in Figs. 1 and 2, formed preferably cylindrical in shape with an outer wall A and inner wall B. These walls A and B are made of acid-resisting material, such as regulus metal or hardened lead, and the outer wall A is preferably cast in hemispherical sections having flanges $a$ by which they may be clamped or fastened together. The walls A and B are stepped and form together an annular space C surrounding an internal space D. At the bottom the walls A and B are continued in the form of inverted cones $A^1$ and $B^1$ respectively. The outer wall A is provided with a discharge pipe $A^2$ leading from the annular space C and delivering into a sump or tank $A^3$. The inner wall B is provided with a discharge pipe $B^2$ leading out through the outer wall A from the internal space D. An inlet pipe E leading from the acid tank T (Fig. 4) is provided for the leaching liquor at the bottom of the vessel passing in through the outer wall A and preferably surrounding the discharge pipe $B^2$ and delivering into the annular space C, the bottom of the inner wall $B^1$ forming a distributer for the liquors. The whole vessel is surrounded with a steam jacket F between the flanges $f$ of which the flanges $a$ are clamped. At the top is a hopper G preferably rotatable, having feed arms $G^1$ delivering the ore into the annular space C. A hood H is also provided, having an upwardly projecting pipe $H^1$ for leading away any fumes formed in the leaching.

The separator vessels are arranged in series or groups. In Fig. 5 is shown one series or group while in Fig. 4 is shown the complete plant containing four such series or groups. Referring to Fig. 3 J is a separator vessel having an inverted conical or pyramidal bottom similar to ordinary settling boxes or "spitzkasten" with a discharge opening L having a control cock $L^1$ or other like device, and an annular lip or launder M at the top. Each vessel is provided with an internal cylinder K into which the sludge is delivered, and a spout N leading from the lip or launder M of one vessel to the cylinder K of the vessel next below it in series. Each series or group of vessels J has a launder P adapted to receive the solids in the form of sludge, as delivered from the openings L, while at the head of each launder P is a sump or tank S for providing wash water or weak solution as hereinafter described. At the lower end of each series or group of separator vessels is a receiving sump or tank R within which the clear solutions are collected as overflowing from the lip M of the last vessel in the series.

Referring to Fig. 4, the vessels in the first group or series are designated $J^1$, in the second $J^2$, in the third $J^3$, and in the fourth $J^4$, and similarly the launders are designated $P^1$, $P^2$, $P^3$, and $P^4$ respectively, the receiving sumps or tanks $R^1$, $R^2$, $R^3$ and $R^4$ respectively, and the washing tanks $S^1$, $S^2$ and $S^3$ respectively, there being no washing tank for the lowermost series. A tank Q is provided for wash water arranged in any convenient position. Each of the tanks $R^1$, $R^2$, $R^3$ and $R^4$ is provided with a pipe $r^1$, $r^2$ $r^3$ and $r^4$ respectively, means for raising the solutions as liquors as required, here shown consisting of air lifts $w^2$, $w^3$ and $w^4$ connected to pipes W containing compressed air. The wash water tank Q is shown with a pipe $q^1$ having an air lift $w^5$ connected to the air pipe W. The pipe $r^1$ from the receiving sump $R^1$ discharges into the second receiving sump $R^2$. The pipe $r^2$ delivers the solution from the receiving sump $R^2$ to the acid storage tank T for reuse in leaching. The pipe $r^3$ delivers from the receiving sump $R^3$ to the washing sump $S^1$. The pipe $r^4$ delivers from the receiving sump $R^4$ to the washing sump $S^2$. The washing sump $S^2$ is replenished with wash water by means of the pipe $q^1$ from the tank Q.

The roasted ore while still hot is delivered into the top of the annular space C of the leaching vessel in which there is an upward current of dilute sulfuric acid as supplied by the pipe E from the tank T. The ore moving downwards from step to step in the annular space C comes into intimate contact with the upward moving current of dilute sulfuric acid and the zinc is dissolved out as sulfate. At the same time strong acid may be introduced into the ore as fed in, and the ore being hot, the temperature is maintained, while the steam jacket F insures the rapid dissolving of the zinc. The liquors and zinc sulfate solution pass over the edge of the inner wall B into the internal space D together with the slimes and finer particles. The gangue and the undissolved mineral particles pass downwards in the annular space C and are continuously withdrawn through the opening $A^2$ and discharged into the sump or tank $A^3$ for subsequent treatment by smelting or otherwise, if necessary.

The solution of zinc sulfate and soluble salts together with the slimes as delivered from the internal space D by means of the pipe $B^2$ are treated in a special manner for the separation of the mechanically contained particles and for obtaining a concentrated or saturated solution of zinc sulfate. But prior to this mechanical separation if there are sulfates of iron or copper present in solution they may be removed by the addition of a suitable quantity of zinc oxid. For this purpose the solutions and slimes from the pipe $B^2$ would be delivered into a special vat where the zinc oxid is added and the mixture agitated before passing to the separators. The iron and copper present are thus thrown down as oxids and the zinc goes into solution as sulfate. These solutions, slimes, oxids, and other solids are then fed into the topmost vessel $J^1$ of the first series or group of separators. The clear solutions flow over the upper edge into the lips or launders M and thence into the receiving sump or tank $R^1$. If the solution in the tank $R^1$ is not sufficiently strong in zinc sulfate it is returned to the storage tank T either direct or through the second receiving sump $R^2$ by means of the pipe $r^4$. The solids and slimes delivered from the bottom of the vessels $J^1$ flow down the launder $P^1$ where they are washed with solution or wash water from the washing sump $S^1$. These alternate settling and washing operations are continued through the subsequent series or groups of settling vessels $J^2$, $J^3$, $J^4$ until the sludge flows out from the lowermost series practically free from any soluble salts. The cycle is maintained by returning the clear solutions obtained from the lower groups back to the washing sumps of the upper groups, as shown, the clear solutions in receiving sumps $R^3$ and $R^4$ going back to washing sumps $S^1$ and $S^2$ respectively by the medium of pipes $r^3$ and $r^4$, while wash water is fed into the washing sump $S^3$. In this way the solutions are gradually worked up to a state of saturation and the solutions contained in the receiving sump $R^1$ becomes concentrated, while at the same time the bulk of liquors in circulation is maintained by replenishing in the washing sump $S^3$ to the extent of the solutions withdrawn from the receiving sump $R^1$. The leaching liquor in the tank T is also continuously replenished with sulfuric acid.

The saturated solution of zinc sulfate is withdrawn from the sump $R^1$ and the zinc sulfate removed by crystallization. Again, any copper or iron present may be removed by the addition of zinc oxid. The other liquors left after crystallization are returned to the tank T for re-use in leaching. The sulfate of zinc obtained in the crystallized form after dehydration is heated in any suitable furnace to form zinc oxid, at the same time the sulfurous acid gases evolved may be utilized for making sulfuric acid for use in the process. The mineral particles and slimes separated from the solutions and delivered from the separator vessels may be further washed in a vat with agitation and subsequently mixed with the residues from the leaching vessel and smelted.

I claim:—

1. An improved process for the treatment of zinciferous ores and metallurgical products consisting essentially of first roasting the ore, second feeding such roasted ore through a current of dilute sulfuric acid moving continuously in an opposite direction, and finally, continuously separating the solution of zinc sulfate from the slimes and undissolved particles by settlement, substantially as described.

2. In a process for the treatment of zinciferous ores and metallurgical products, feeding the roasted ore downwardly through an upwardly moving current of dilute sulfuric acid, and drawing off the solution of zinc sulfate at the top, and the gangue and undissolved mineral particles at the bottom, substantially as described.

3. An improved process for the treatment of zinciferous ores and metallurgical products, consisting of first roasting the ore to form a maximum amount of sulfate of zinc, and a minimum amount of sulfates of iron and copper, then feeding such roasted ore downwardly into a vessel in which there is an upwardly moving current of dilute sulfuric acid, withdrawing the gangue and undissolved mineral particles from the said vessel at the bottom, and withdrawing the solution of zinc sulfate and other soluble salts together with the slimes and certain mineral particles at the top, and finally subjecting the said solutions and the slimes and certain mineral particles to alternate settling and washing of the solids, substantially as described.

4. In a process for the treatment of zinciferous ores and metallurgical products in which the roasted ore is treated with dilute sulfuric acid, separating the solutions of zinc sulfate and soluble salts from the slimes and undissolved particles by subjecting them to alternate settlement and washing of the solids, the clear solutions obtained in the lower settling operations being used for the higher washing operations to produce a concentrated solution of sulfate of zinc, substantially as described.

5. In a process for the treatment of zinciferous ores and metallurgical products in which the roasted ore is fed through an upwardly moving current of dilute sulfuric acid, passing the solutions and slimes and certain mineral particles carried therewith through series or groups of settling boxes or separators and returning the clear solutions obtained from the lower series or groups of settling boxes or separators to the upper series or groups for washing the solids in their passage between the series or groups of boxes or separators, substantially as described.

6. An improved process for the treatment of zinciferous ores and metallurgical products consisting of first roasting the ore, second feeding such roasted ore downwardly through an upwardly moving current of dilute sulfuric acid, thirdly, adding zinc oxid for the precipitation of any iron or copper present in solution, and finally separating the solutions from the solids by subjecting them to alternate settling and washing operations, substantially as described.

7. An improved process for the treatment of zinciferous ores and metallurgical products consisting in first roasting the ore, second feeding such roasted ore downwardly through an upwardly moving current of dilute sulfuric acid, fourthly separating the solutions of zinc sulfate and soluble salts from the solids by alternate settling and washing operations, fifthly removing the zinc sulfate from solution by crystallization, and finally heating the zinc sulfate crystals to form zinc oxid, substantially as described.

8. An improved process for the treatment of zinciferous ores and metallurgical products consisting of first roasting the ore, second feeding such roasted ore downwardly through an upwardly moving current of dilute sulfuric acid, thirdly adding zinc oxid for the precipitation of any iron or copper present in solution, fourthly separating the solution of zinc sulfate from the solids by alternate settling and washing operations, the clear solutions from the lower settling operations being used for the higher washing operations, fifthly removing the zinc sulfate from solution by crystallization, and finally, heating the zinc sulfate crystals to form zinc oxid, substantially as described.

9. An improved process for the treatment of zinciferous ores and metallurgical products consisting of first roasting the ore, second feeding such roasted ore downwardly through an upwardly moving current of dilute sulfuric acid, thirdly drawing off the gangue and undissolved mineral particles at the bottom, fourthly, withdrawing the solutions of zinc sulfate and soluble salts at the top together with slimes and certain particles carried therewith, fifthly adding zinc oxid to precipitate the iron and copper, sixthly separating the solutions from the solids by passing them through series or groups of settling boxes or separators, seventhly, subjecting the solids as passing between each series or group of separators to a wash with clear solutions obtained from the lower series or group of separators to obtain a concentrated solution of zinc sulfate, eighthly, removing the zinc sulfate from solution by crystallization, and finally heating the zinc sulfate crystals to form zinc oxid, substantially as described.

10. In a process for the treatment of zinciferous ores and metallurgical products, feeding the roasted ore by gravity through a current of dilute sulfuric acid moving continuously in an opposite direction, and separating the solution of zinc sulfate from the solids, substantially as described.

In testimony whereof I have hereunto set my hand in presence of two subscribing witnesses.

JAMES HYNDES GILLIES.

Witnesses:
CLEM A. HACK,
PERCY HEDGES.